United States Patent [19]

Price

[11] 3,730,042
[45] May 1, 1973

[54] SAWING MACHINE

[76] Inventor: Ira Emmet Price, 13606 Emery Avenue, Cleveland, Ohio 44135

[22] Filed: Oct. 2, 1970

[21] Appl. No.: 77,566

[52] U.S. Cl. ............... 83/471.3, 83/473, 83/489, 83/581, 83/859
[51] Int. Cl. .................... B27b 5/20, B27b 9/04
[58] Field of Search ............... 143/6 E, 6 G, 6 J, 143/43 E, 47 F, 132 A, 132 B, 89, 89 A, 169; 83/471.3, 473, 489, 581, 859

[56] References Cited

UNITED STATES PATENTS

| 2,911,017 | 11/1959 | Holder | 143/6 E |
|---|---|---|---|
| 3,021,881 | 2/1962 | Edgemond, Jr. et al. | 143/132 B X |
| 2,704,092 | 3/1955 | Green | 143/6 G |
| 1,700,189 | 1/1929 | Wikstrom | 143/6 G X |
| 3,130,758 | 4/1964 | McKinley | 143/6 G |
| 2,810,412 | 10/1957 | Roug | 143/6 E |

*Primary Examiner*—Andrew R. Juhasz
*Assistant Examiner*—James F. Coan
*Attorney*—Kenneth G. Preston, Jr.

[57] ABSTRACT

A portable sawing machine having a sawing table and hinged saw guide tracks adapted to movably retain a normally hand-held, portable, motor-driven saw thereon for rapid and precise angular cross-cutting of workpieces placed on the table.

3 Claims, 15 Drawing Figures

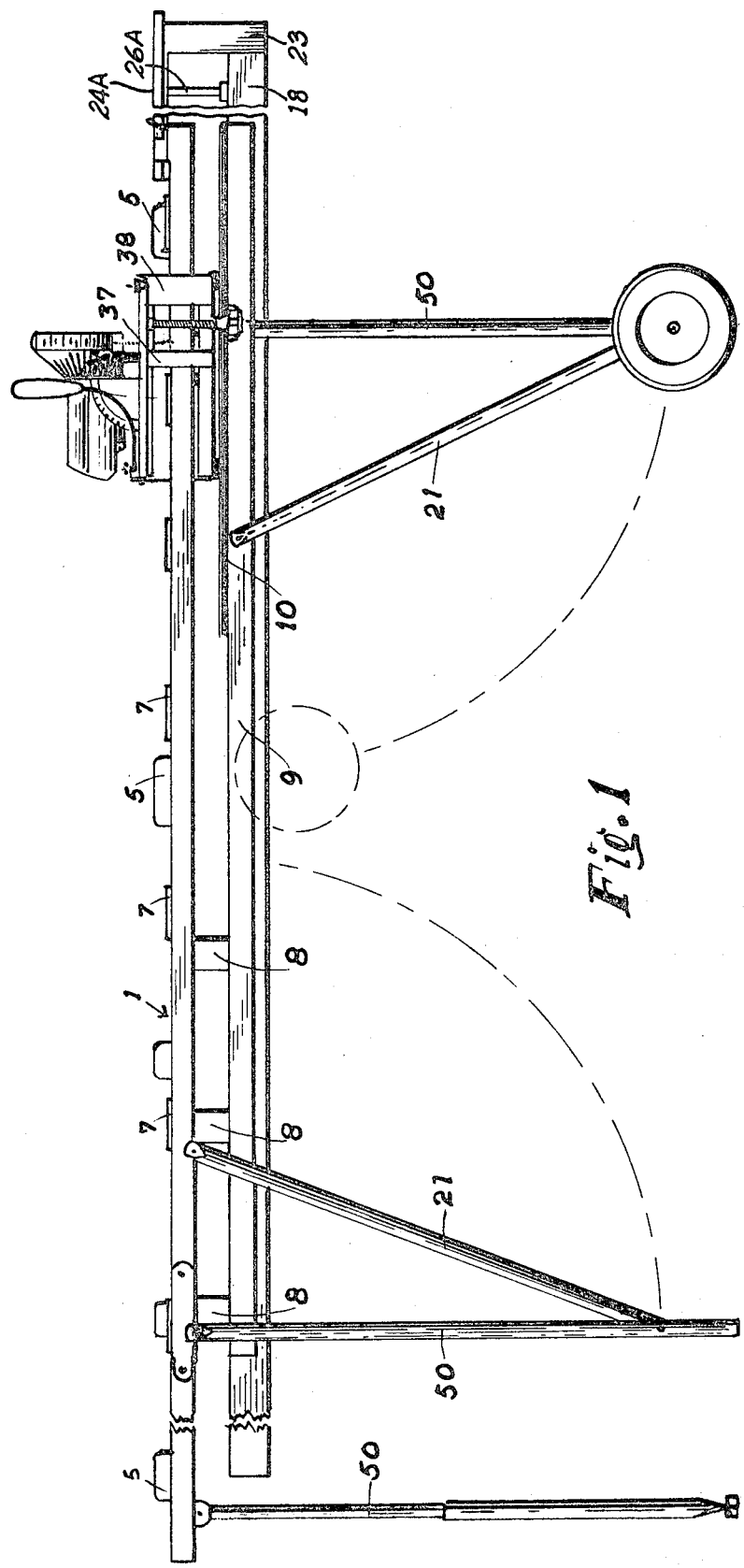

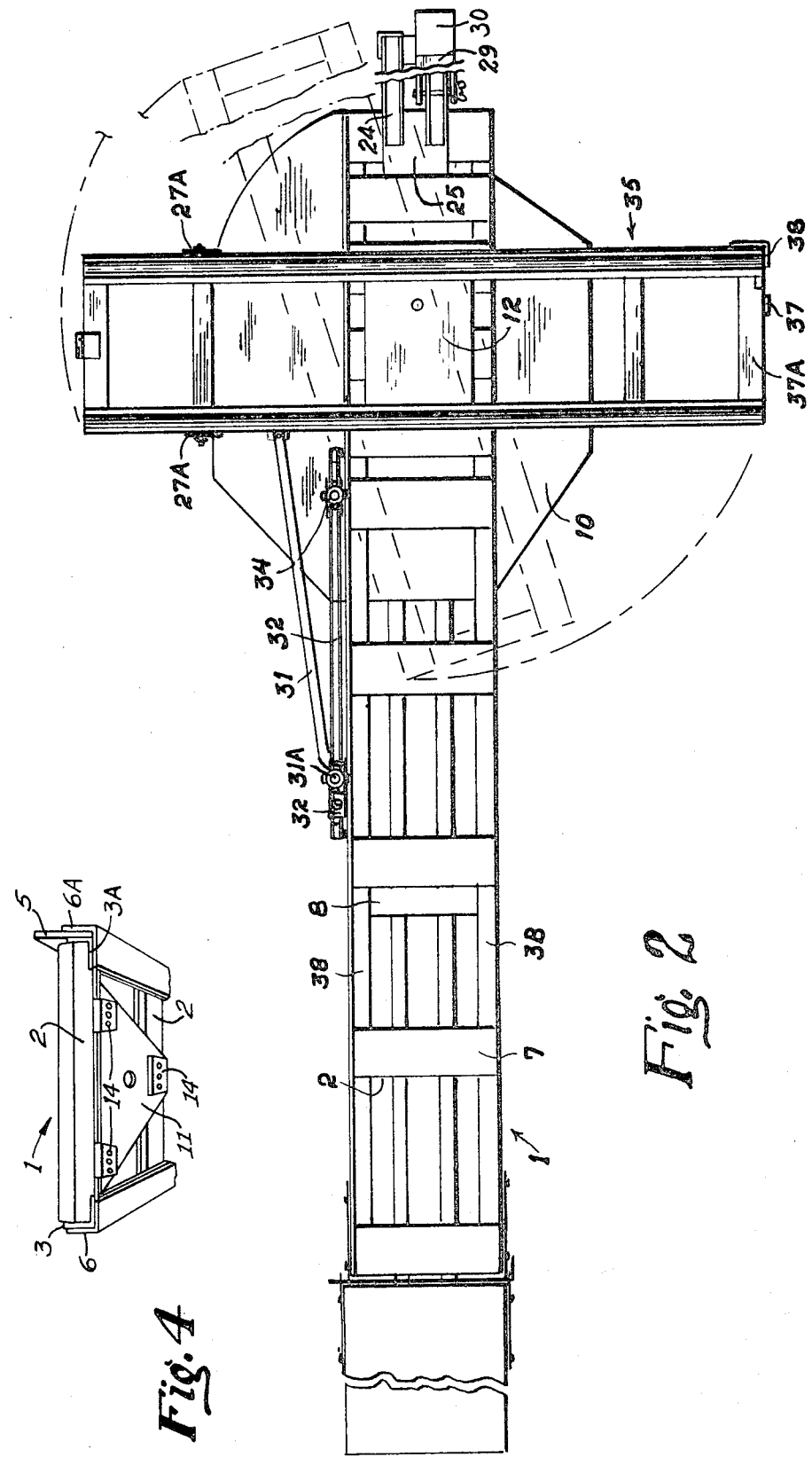

INVENTOR
IRA E. PRICE

INVENTOR
IRA E. PRICE

INVENTOR
IRA E. PRICE

INVENTOR
IRA E. PRICE

SAWING MACHINE

BACKGROUND OF THE INVENTION

This invention pertains to the field of sawing operations and comprises a portable sawing table, saw tracks and guides, and related accessories and components for a portable, job-site sawing machine for quickly and accurately sawing material. An example of the use of such a machine would be in aluminum siding applications for home construction.

This invention is an improvement in the circular saw guide first invented and described by me in my U.S. Pat. No. 2,818,892 granted Jan. 7, 1958.

SUMMARY OF THE INVENTION

The sawing machine described herein comprises a sawing table for supporting a workpiece, and a bedplate secured beneath the sawing table to slideably support a portable saw guide frame. The guide frame may be quickly positioned and locked in place with respect to the sawing table and bedplate for repetitive angular cuts of workpieces.

Particular objects and features of the invention disclosed herein include increased accuracy, safety and efficiency in sawing operations by virtue of improved workpiece locating, measuring and angle cutting means. Another feature is a protractor constructed to mechanically measure and communicate angles to the saw guide, rather than as commonly practiced with a tape measure, a pencil and try square; and miter ways and clamps to lock the angles so communicated into the machine.

A further object and feature is centering plates created to maintain a rigid centering and parallelization of pivoting members, and drag control in pivoting the sawing guide horizontally. Still another object is the provision of saw tracks, hinged and automatically counterbalanced to lift them out of the way of work preparation on the sawing table; preparation such as marking, scoring, stacking and positioning.

Another feature is providing replacable fences located at the back edge of the sawing table, held firmly in place yet easily and quickly removed and replaced when damaged by handling and sawing. Still another objective is an extensible table instantly projectable from the underside of the machine to support, measure, abut and secure workpieces in position for cutting.

A further and major object is portability; major units are articulated for simple, fast and easy loading and unloading, easily and quickly set up and struck and moved from location to location on the job, and moved from job to job.

BRIEF DESCRIPTION OF THE DRAWING

FIG. 1 is a front elevational view of the machine, showing a portable power saw mounted on the tracks.

FIG. 2 is a top plan view of the machine, less the power saw.

FIG. 4 is a perspective view of a pivot plate bolted to the underside of the sawing table.

DESCRIPTION OF THE PREFERRED EMBODIMENTS

Figure 5:
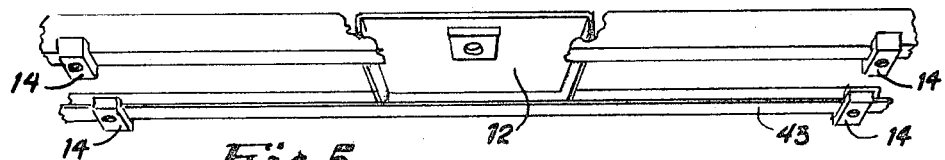
FIG. 5 is a perspective view of a turnplate welded intermediate the ends of the frame bars supporting the tracks.

Referring in detail to FIGS. 1 through 4, the numeral 1 indicates a sawing table having parallel angle bars 3 and 3A with horizontal flanges 3B extending inwardly, spanned at intervals by shallow rectangular aluminum channel beams 2. The ends of the beams 2 are welded or otherwise affixed to the inwardly extending flanges 3B of bars 3 and 3A. Both sides of the table frame are strengthened by the attachment of angle bars 6 and 6A in support of bars 3 and 3A, FIGS. 3 and 4. The adjacent vertical and horizontal flanges of bars 3 and 6, and the horizontal flanges of bars 3A and 6A are secured by bolts or welding; whereas the vertical flanges of bars 3A and 6A are spaced apart enough to form a channel to receive rectangular plates of easily sawable material designated as fences 5. These fences are necessary for the alignment of work to be sawed as will be discussed hereinafter. The vertical flanges of bars 3A and 6A serve as elongated jaws of a clamp with bolts (not shown) piercing them at required intervals as a means of holding the fences 5 in a firm grip against the impact of workpieces positioned on the table against them, and to permit easy removal and replacement of the fences when they become damaged.

Channel beams 2 are fitted with inlays 7, such as rectangular blocks of wood placed between the upwardly directed sides or flanges of the beams, and held with brads driven into them through holes pierced in the beam flanges. The beams and inlays and their supporting frame form a sawing table with an upper inlay surface which can be cut into and through with little adverse effect on the teeth of saw blades. The beams are spaced apart far enough to make easy the clearing of any embedment or accumulation of chips, shavings or particles that may abrade and mar the workpieces supported thereon.

Aluminum angle support bars 9 located directly beneath and parallel to the sawing table are bolted to the table at one end through a number of transversely positioned rectangular spacer blocks 8. The other ends of the bars 9 are free to support a bedplate 10.

The bedplate 10 may be a laminate cored with a tempered hard board, the top sheet of the laminate having a high antifriction coefficiency. Other lightweight materials having low coefficients of friction could be used.

Figure 6:
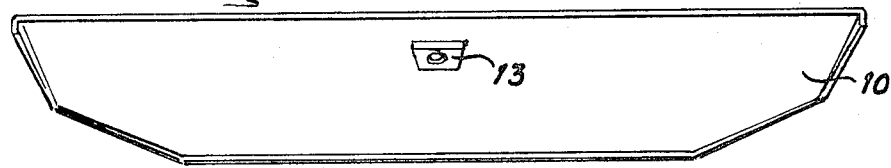
FIG. 6 is a perspective view of a section of the bedplate.

Considering FIGS. 4, 5 and 6 to be exploded perspective views of aligned parts, the sawing table is provided with an apertured pivot plate 11 secured to the underside thereof. Bedplate 10 has a pair of apertured metal blocks 13 (one shown) attached to each other through the bedplate which is similarly apertured. The aperture in underside block 13 is threaded. Positioned between the pivot plate and bedplate for relative rotation therewith is an apertured turnplate 12 secured to saw guide 35. The turnplate is attached intermediate the ends of saw guide frame members 43 to be described in detail hereinafter.

When assembled, the apertures in pivot plate 11, turnplate 12, bedplate 10 and blocks 13 are aligned and a bolt (not shown) is passed therethrough and secured in threaded block 13. This simple arrangement of parts provides means for pivoting turnplate 12 and its associated saw guide frame with respect to the bedplate and table unobstructed through its designed arc of rotation. The bolt provides means for maintaining the centering rigidity required for all horizontal positions of the guide frame between the sawing table and bedplate. Both the pivot plate and frame members 43 attached to the turnplate are provided with plastic blocks or shoes to facilitate relative sliding of the plates 10, 11 and 12.

Figure 7:
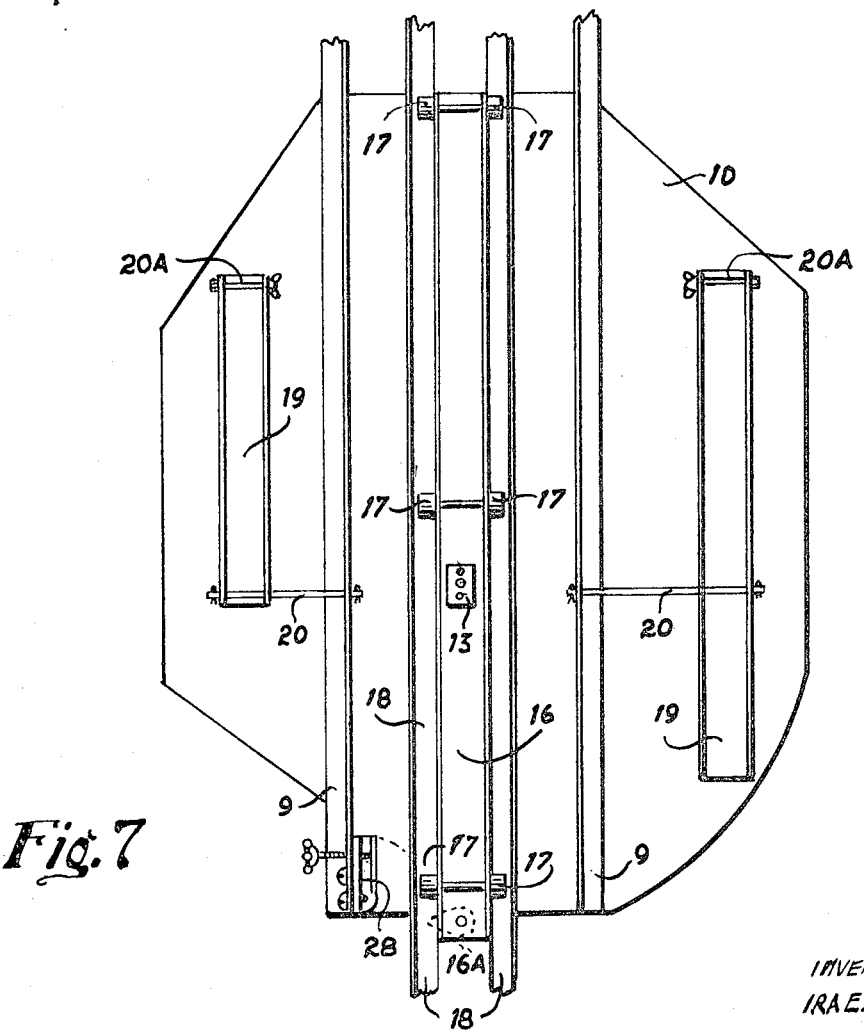
FIG. 7 is a plan view of the underside of the bedplate.
Figure 3:
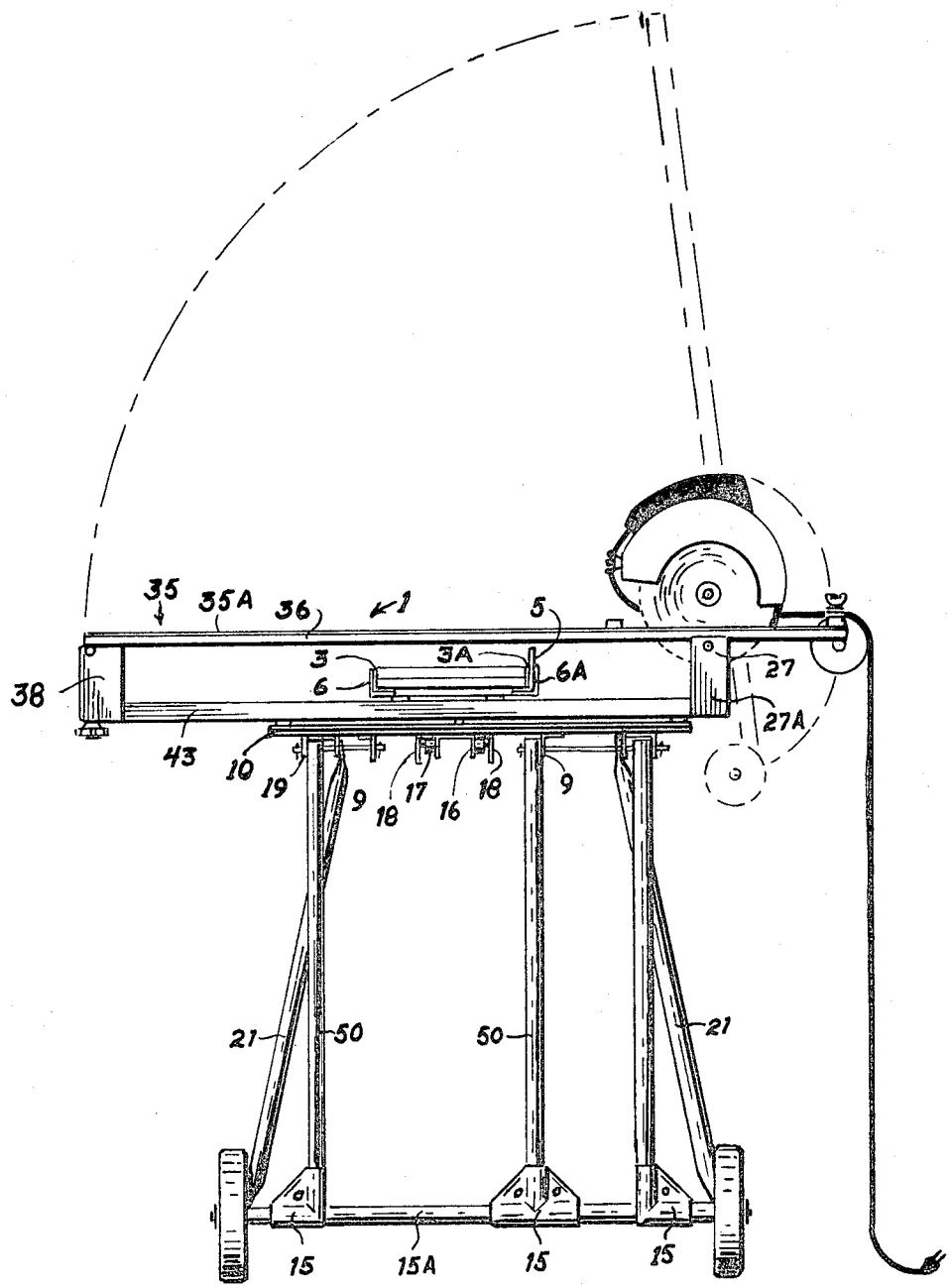
FIG. 3 is an end elevational view including the power saw, but without the extensible table.
Figure 8:
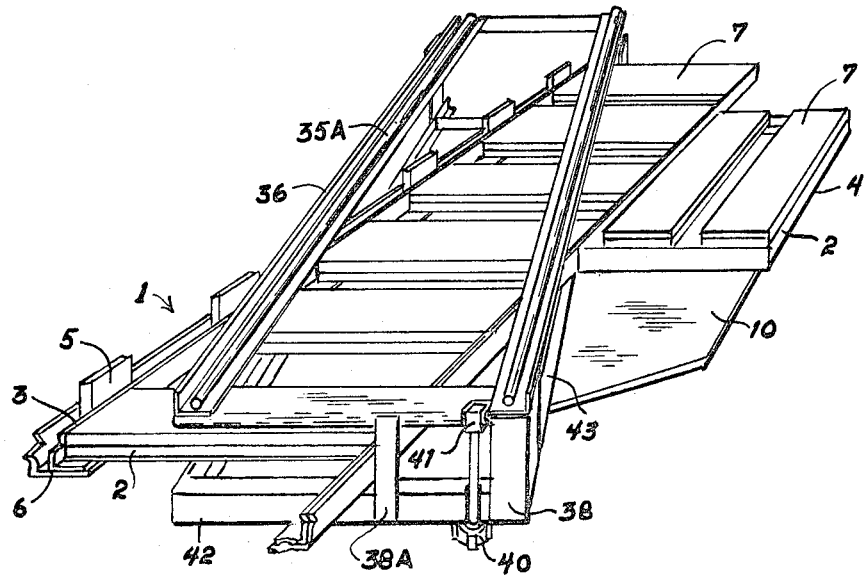
FIG. 8 is a perspective view of the machine less the saw and miter ways and showing a small table projecting laterally from the edge of the sawing table, designed to support work wider than the sawing table.
Figure 9:
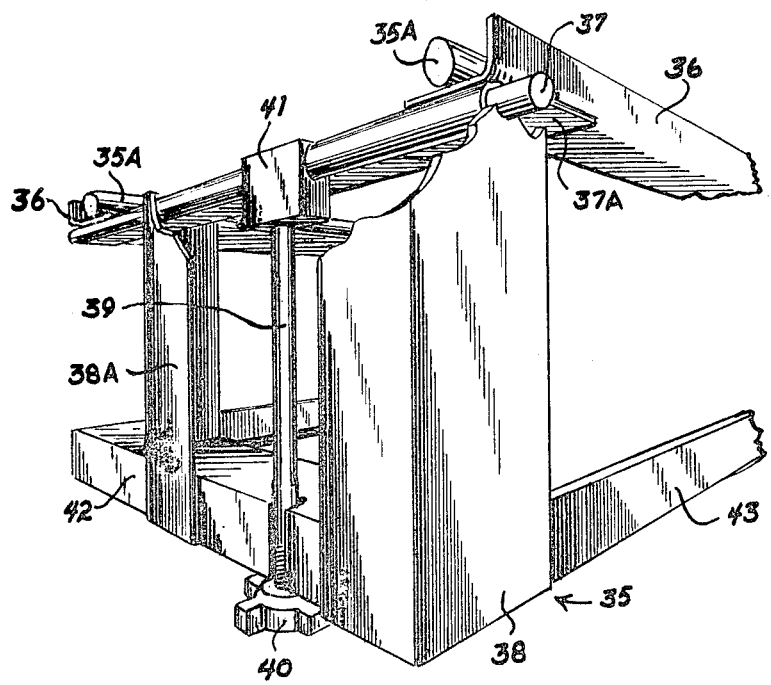
FIG. 9 is a perspective view of the cantilever construction of the foot of the tracks and frame of the saw guide supporting the tracks.

On the underside of bedplate 10, aluminum or other lightweight channels 16 and 19 are secured, FIG. 7, serving as ribs along with bars 9 to stiffen the bedplate and keep it rigidly flat and parallel to the sawing table. Channels 19 also provide means of attachment for the undercarriage of the sawing machine as best seen in FIGS. 1, 3 and 7. The undercarriage is constructed of tubular legs 50 and leg braces 21 detachably and swingably hinged by bolts 20, 20A to angle bars 9 and channels 19. Legs 50 may be clamped to an appropriate wheel and axle assembly by pyramid tube clamp 15 for which I made application for patent, Ser. No. 109,676.

Channel 16 is equipped with pairs of idlers 17 providing roller support for angle bars 18. Parallel bars 18 form rails of an extensible table frame, FIGS. 1, 3, 7, 11 and 12.

The extensible table is supported by an elongated rectangular frame constructed of angle bars 18 held parallel with block spacers 22. The vertical flange of angle bars 18 is double the width of the horizontal flange and extends downwardly to supply the vertical strength needed to keep the bars straight and parallel with the ground when the table is loaded with work and fully extended. The horizontal flanges of the bars extend inwardly and serve as rails supporting the frame as it rides to and fro on the idlers 17, FIG. 7.

Figure 11:
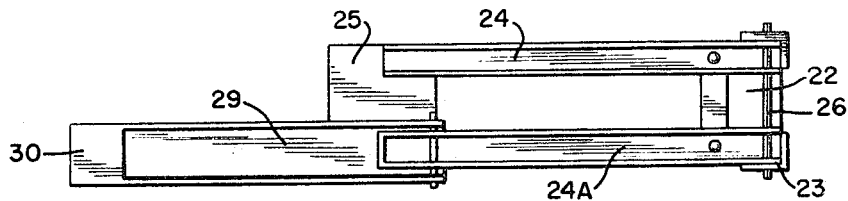
FIG. 11 is a plan view of the extensible table.
Figure 12:
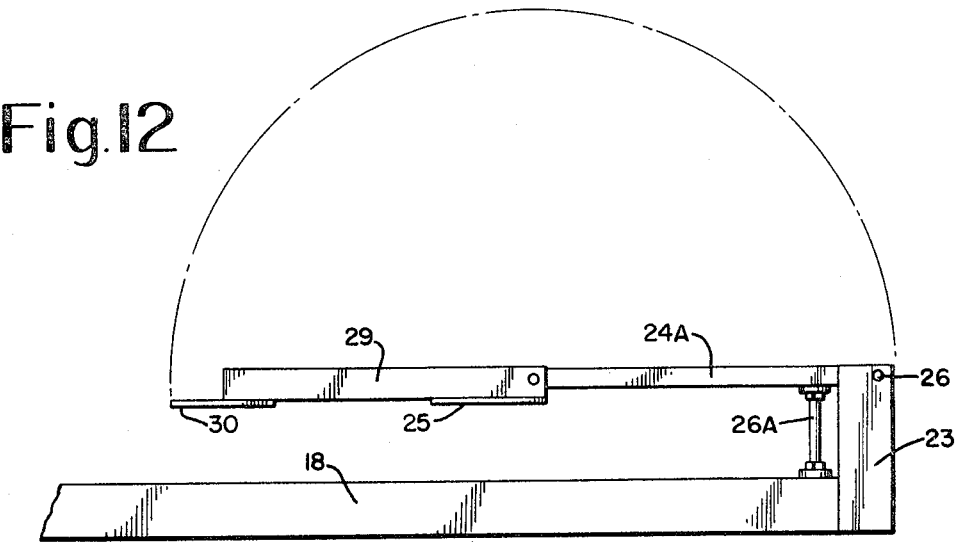
FIG. 12 is an elevational side view of the extensible table.

The extensible table, FIGS. 11 and 12, is mounted on two angle posts 23 projecting upward from the corners of frame bars 18 and comprises channel bars 24 and 24A welded on the underside to a plate 25. A portion of plate 25 projects from under the bars to form a shelf. The other ends of bars 24, 24A are hinged to posts 23 by pin 26 so that they may be adjusted up and down by bolts 26A to maintain plate 25 in line with the surface of the sawing table. Thus the right-hand end of a workpiece, as might be viewed in FIGS. 1 and 2, would be supported by plate 25 and in abutment with the ends of bars 24, 24A.

To ensure professional accuracy in measuring work with the extensible table, a steel tape measure (not shown) is secured to the top of one angle bar 18. The tape measure is complemented by an adjustable indicator 16A attached pivotally to a shelf formed by the end of channel bar 16, and a clamping means 28, FIGS. 7 and 15, attached to channel bar 9, and designed to lock the extensible table to channel bar 16.

Figure 15:
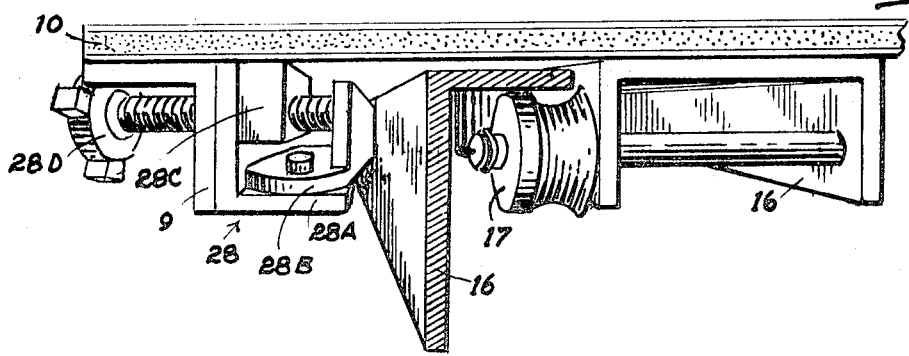
FIG. 15 is a perspective view of a clamping means attached to the bedplate for locking the extensible table.

Clamp 28 for locking the extensible table frame member 18 to the bedplate, FIG. 15, comprises an angle section 28A affixed to bar 9 pivotally supporting a swivel lock 28B. Block 28C is also secured to angle 28A, and has a threaded aperture receiving locking bolt 28D in line with the swivel lock. It may be readily understood that turning bolt 28D into engagement with swivel 28B will cause the swivel 28B to rotate into locking engagement with bar 18.

The tape measure is located on the bar 18 such that the measure reading opposite indicator 16A corresponds to the distance from the saw blade to the abutment ends of bars 24, 24A. Accordingly, when a workpiece of a particular length is desired, the extensible table is extended until the tape measure reading corresponding to the desired length is opposite the indicator. The table is then locked in place by clamp 28, a workpiece placed on the sawing table in abutment with bar ends 24, 24A, and the piece is ready to be sawed.

When it is desired to cut workpieces with very shallow angles, say 15°, bars 24, 24A of the extensible table may interfere with the saw guide. Yet workpiece supporting and abutment means are necessary to properly locate and secure the piece during cutting. Accordingly, a channel bar 29 is hinged to the butt end of channel 24A, FIGS. 11 and 12.

Welded to the underside of bar 24A is a rectangular aluminum plate 30 projecting for half of its length to form a shelf, the butt end of the bar serving to abut work against the angular pull of high R.P.M. saw blades when cutting extremely shallow angles, thus preventing damage to and destruction of work, injury to the operator and costly scrapping of material. The hinging of bar 29 permits the operator to swing it up and out of the way to clear the extensible table for normal functioning.

As mentioned hereinabove, turnplate 12 is attached to frame bars 43 of a saw guide 35 so as to permit rotation of the guide relative to the sawing table 1 and bedplate 10. Guide 35 includes an underframe comprising bars 43, crosspieces 42 and, at one end, upright support posts 27A and pivot bolts 27 for pivotally supporting parallel guide tracks 35 and track beds 36, FIGS. 2, 3, 8, 9, 10. The other ends of the tracks 35 and beds 36 are joined by hinge plate 37A and hub 37. The hub and hinge plate rest upon cradles 38 and 38A projecting upwardly from one underframe bar 43 and crosspiece 42 when guide tracks 35A are parallel with the surface of the sawing table, and may be locked in this parallel position by a swivel clamp means 39, 40, 41 secured to hub 37 and acting between the hub and crosspiece 42. A power saw may be mounted for movement along the tracks by any suitable means such as described in my aforementioned U.S. Pat. No. 2,818,892.

Saw guide 35 is located with respect to pivot pins 27 so that when the saw is docked at the right end of the guide, approximately as shown in FIG. 3, the weight of the saw counterbalances the saw guide to permit the guide to be raised, as shown in dotted lines, and to be safely held in substantially perpendicular position until returned to cradles 38, 38A by the operator. This permits the operator to freely maneuver workpieces on the sawing table.

Figure 10:
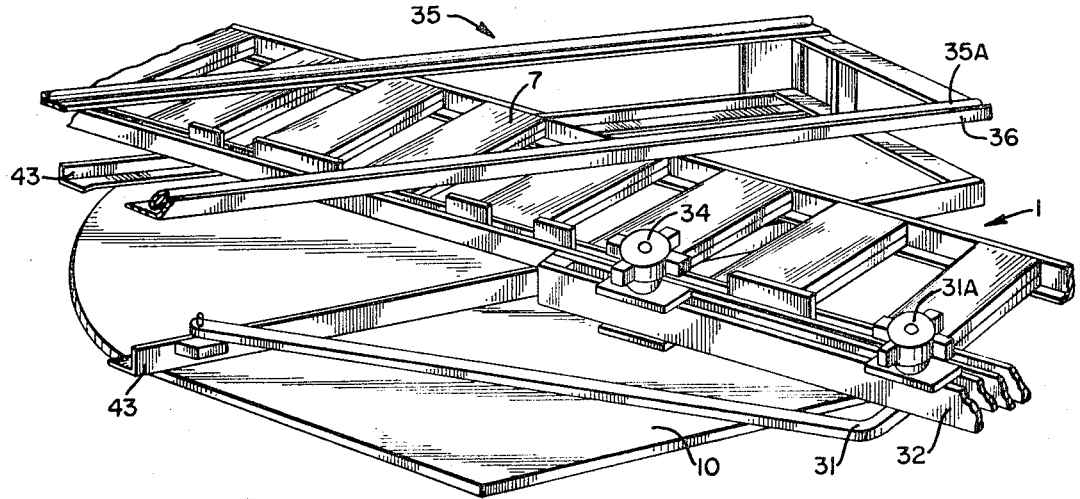
FIG. 10 is a perspective view of the tracks and frame, the sawing table and bedplate and featuring the saw guide clamping arm connecting the guide with the clamping ways.

Referring to FIGS. 2 and 10, it will be noted that table 1 is provided on one side with clamping ways 32. A guide rod or arm 31, pivotally attached at one end to guide underframe member 43, has clamp 31A affixed to the other end and carried by ways 32 for selectively clamping along ways 32. Movable clamps 33 and 34 are also carried by the ways to provide suitable abutments for limiting the rotative movement of the saw guide with respect to the sawing table, it being remembered that the pivot plate 11, turnplate 12 and bedplate 12 are rotatably interconnected, FIGS. 4, 5, 6.

In the usual instance, clamp 33 would be so located that the saw guide tracks are perpendicular to the sawing table when clamp 31A is in abutment with clamp 33, FIG. 2. Clamp 34, on the other hand, would be placed to abut clamp 31A when the saw guide is rotated to some predetermined cutting angle.

Because of the speed at which the saw guide must be pivoted horizontally to keep pace with the application of work and because of the concomitant need to operate at this speed with safety and to prevent clamping block 31A, FIG. 10 at the end of connecting rod 31 from slamming into the other clamping blocks in the clamping ways and jolting them out of adjustment, an even drag is incorporated in and applied to the movement of the saw guide by means of plastic shoes in the form of rectangular blocks 14 attached to pivot plate 11, FIG. 4 and augmented by like shoes 14 attached to the underside of saw guide frame rails 43, FIG. 5. The drag may be increased or decreased, according to the wishes of the operator, by merely tightening or loosening the pivot bolt connecting plates 10, 11, 12.

Figures 13, 14:
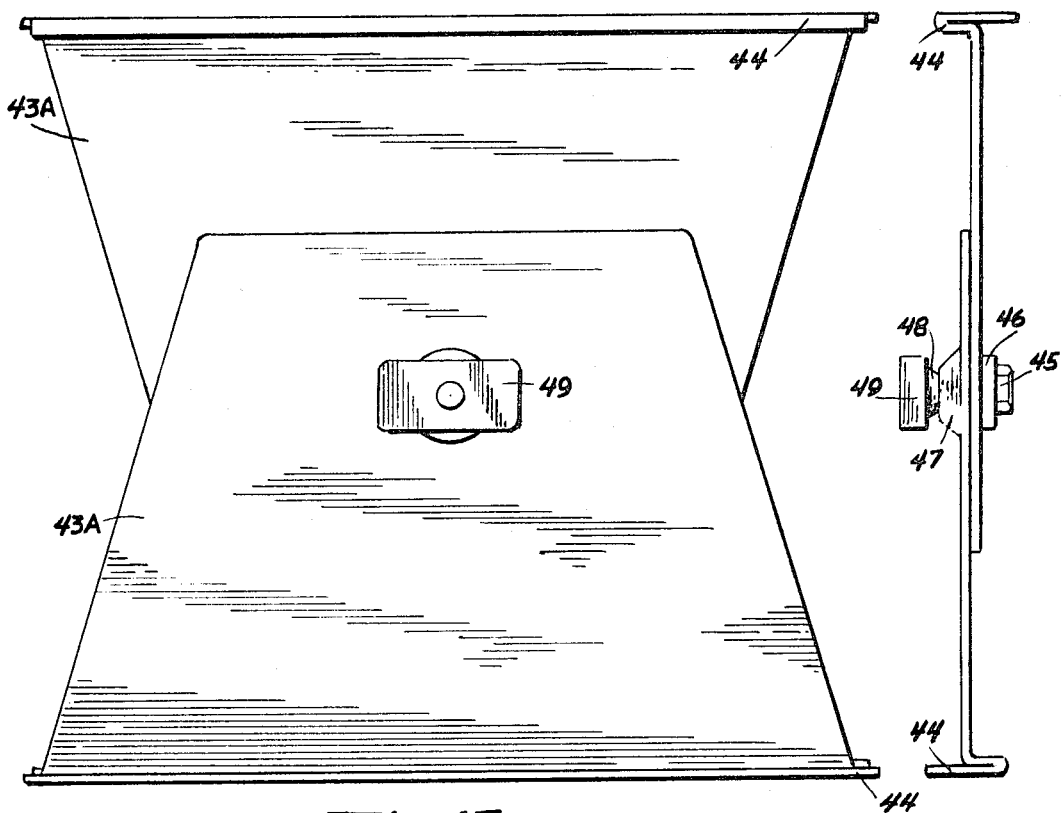
FIG. 13 is a plan view of the double-T protractor.
FIG. 14 is an elevational side view of the protractor.

For use in quickly and accurately adjusting the appropriate angle of cutting, for example aluminum siding to fit a sloping roof line or gable, the machine is equipped with a unique articulated protractor, FIGS. 13 and 14.

The halves of the protractor broadly represent "T's" in that their vertical portions 43A taper inwardly from their long double flanges 44 formed from the widest edges of vertical portions 43A and represent the superior bars of T's. The T's so formed are secured to each other intermediate their flanges and the edges opposite the said flanges through transverse holes in portions 43A, by a pivot bolt 45. The bolt is placed through an orificed rectangular block 46, both members 43A, two washers 47 and 48 and threaded into a rectangular knob 49. Both washers are countersunk, with washer 47 being larger than washer 48. Thus the smaller end of washer 48 and its tapered surface may be seated in the smaller end of washer 47. Rotated clockwise, the knob 49 and washers become a broadly based clamping means sufficient to hold angles obtained by the protractor against extremely rough handling.

In application of aluminum siding, it is only necessary to align the bottom flange 44 with a horizontal edge of siding on a house, adjust the other flange 44 against or parallel to the roof line, and clamp the protractor halves in this position. The angle may then be directly communicated or relayed to the sawing machine by placing one flange 44 against the fence 5 of the sawing table, and swinging the saw guide against or in line with the other flange.

Thus the protractor will take a roof pitch directly from a gable and transfer it directly to the saw guide with little or no possibility of error in the transmission, reducing the time ordinarily consumed by this operation approximately 50 per cent. Clamps 33 and 34 also make it simple to cut two angles in a single piece of work with one locking operation, a time and work saver in cutting siding to fit gables.

I claim:

1. In a sawing machine, the combination of a table member having a work supporting surface, a base plate affixed beneath the table member, a saw guide rotatable with respect to said table and plate including a base frame slideably carried on the base plate and connected for rotation by a single pivot pin and a saw track supported by the base frame above the table for supporting and guiding a power saw during cutting strokes at predetermined angles, said base plate and table member being of cantilever construction to permit easy removal of the saw guide from the open side thereof, said table member having ways mounted thereon, a guide arm attached at one end to the saw guide and, at its other end, slideably received along said ways, and adjustable stops on said ways providing abutments for said guide arm and attached saw guide corresponding to preselected saw guide positions relative to the table.

2. The machine according to claim 1 wherein the guide arm, adjustable stop and ways may be positioned to permit sawing along any angular line within 75° of perpendicular with the table in one direction from the perpendicular.

3. In a sawing machine, the combination of a table member having a work supporting surface, a base plate affixed beneath the table member, and a saw guide rotatable with respect to said table and plate including a base frame slideably carried on the base plate and connected for rotation by a single pivot pin and a saw track supported by the base frame above the sawing table for supporting and guiding a power saw during cutting strokes at predetermined angles, said base plate and table member being of cantilever construction to permit easy removal of the saw guide from the open side thereof, said saw guide and table having portions proximate the pivot axis provided with shoes for sliding contact with the others of guide, table and bedplate, and wherein the relative slideability of the guide, table and bedplate may be enhanced or reduced by loosening or tightening, respectively, the pivot connection.

* * * * *